(No Model.)
W. A. SCOTT.
HOE.
No. 589,863.   Patented Sept. 14, 1897.
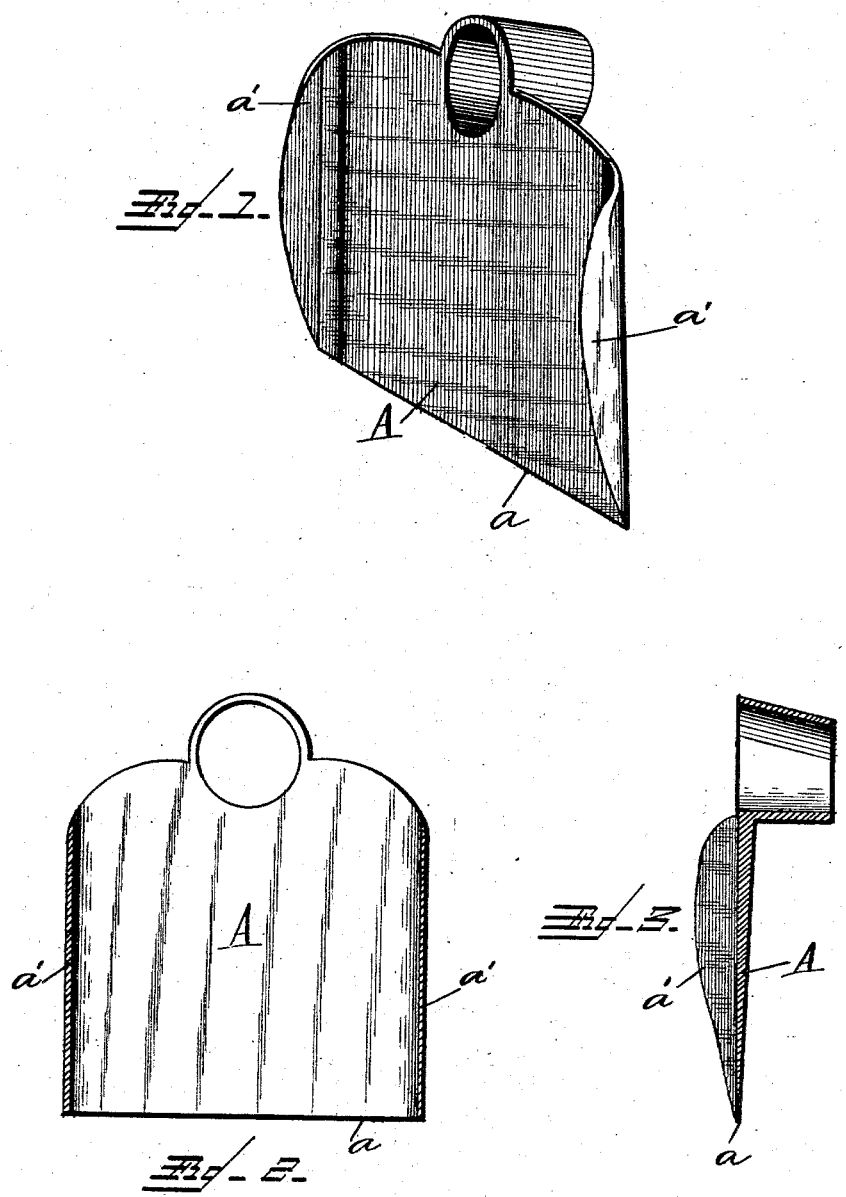
Witnesses
Jos. Gregory
Inventor
William A. Scott
By John Wedderburn
his Attorney.

UNITED STATES PATENT OFFICE.

WILLIAM AUGUSTUS SCOTT, OF QUINCY, FLORIDA.

HOE.

SPECIFICATION forming part of Letters Patent No. 589,863, dated September 14, 1897.

Application filed January 28, 1896. Serial No. 577,203. (No model.)

*To all whom it may concern:*

Be it known that I, WILLIAM AUGUSTUS SCOTT, a citizen of the United States, residing at Quincy, in the county of Gadsden and State of Florida, have invented certain new and useful Improvements in Hoes; and I do hereby declare the following to be a full, clear, and exact description of the invention, such as will enable others skilled in the art to which it appertains to make and use the same.

This invention relates to certain new and useful improvements in hoes; and it has for its objects, among others, to provide a simple and cheap hoe of greater strength and which may be employed for cutting large roots and bushes in working land, without bending. I form the hoe with a beveled or turned side or sides, so that in cutting by a plant the hoe will not scrape the bark from the plant, and further adapting the hoe for use upon the side when necessary. I prefer to have the beveled side or sides come down to the cutting-blade.

Other objects and advantages of the invention will hereinafter appear, and the novel features thereof will be particularly pointed out in the appended claim.

The invention is clearly illustrated in the accompanying drawings, which, with the letters of reference marked thereon, form a part of this specification, and in which—

Figure 1 is a perspective view of my improved hoe. Fig. 2 is a cross-section through the same. Fig. 3 is a longitudinal section.

Like letters of reference indicate like parts in the several views.

Referring now to the details of the drawings by letter, A designates the blade, formed of a single piece with its point sharpened, as at $a$, and at one or both sides turned up, as seen at $a'$, and the turned sides extending clear to the cutting-point of the blade and formed preferably with a curved upper edge. As before stated, one or both sides or edges of the blade can thus be turned up or sharpened. These beveled or turned sides act as a strut the full length of the blade of the hoe, so that in cutting large roots, shrubs, and bushes, as in working land, the blade of the hoe will not bend.

It will thus be seen that I provide a very strong and durable blade for hard usage. The beveled side or sides in pulling the hoe by a plant prevent the scraping of the bark therefrom, as they are smooth upon their outer faces and will be so kept by the soil. In using the hoe on the sides also it gives the hoe a cutting push motion for pushing off the grass and weeds on the opposite side of the row and the opposite side of the plants by turning the hoe on the side and pushing from you.

Modifications in details may be resorted to without departing from the spirit of the invention.

Having thus described the invention, what is claimed as new is—

A hoe having the sides of the blade turned backward, the edges of the backward-turned portions curved from top to bottom of said blade and sharpened, substantially as set forth.

In testimony whereof I have signed this specification in the presence of two subscribing witnesses.

WILLIAM AUGUSTUS SCOTT.

Witnesses:
   I. H. GREGORY,
   T. W. MITCHELL.